Nov. 24, 1925.

C. S. FOGH 1,563,271

PROCESS OF RECOVERING OIL FROM SHALE

Filed Nov. 26, 1920    2 Sheets-Sheet 1

Inventor:
Carl S. Fogh
by Byrne Townsend Bickenstein
Attorneys.

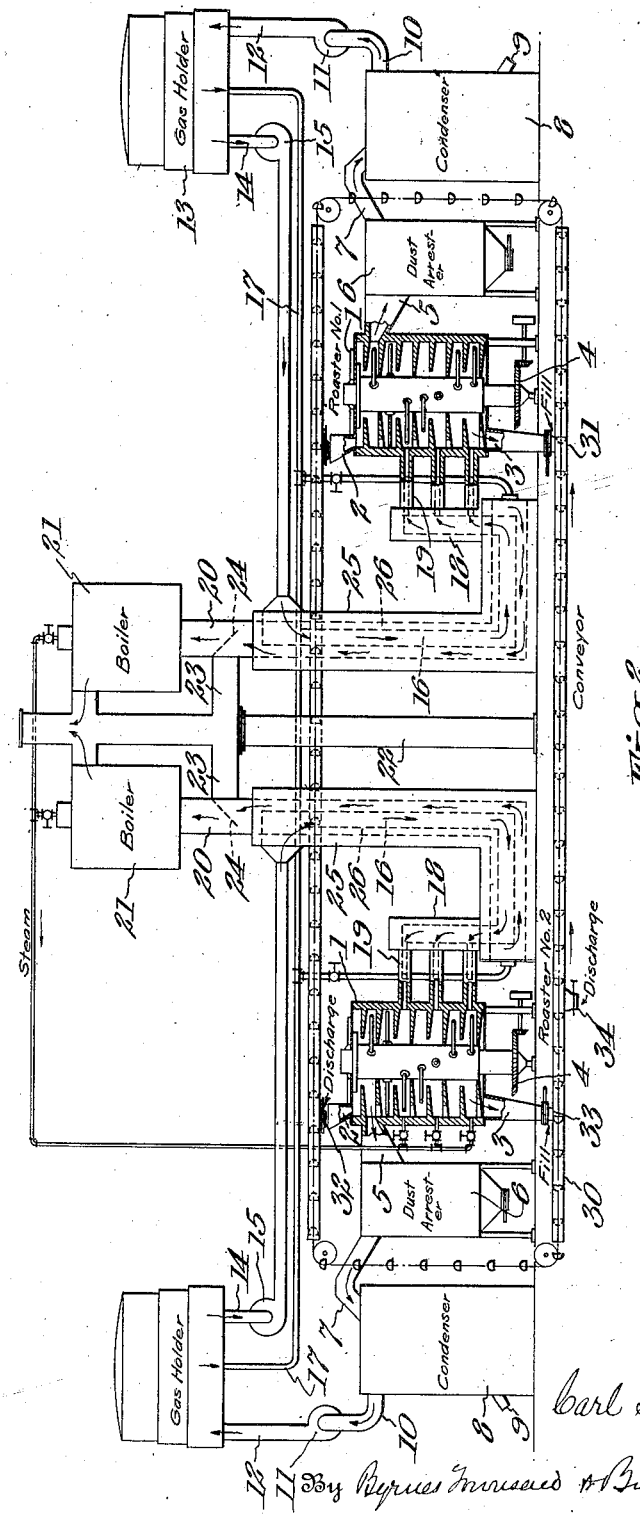

Patented Nov. 24, 1925.

1,563,271

UNITED STATES PATENT OFFICE.

CARL S. FOGH, OF PHILADELPHIA, PENNSYLVANIA, ASSIGNOR TO ORE ROASTING DEVELOPMENT COMPANY, OF PHILADELPHIA, PENNSYLVANIA, A CORPORATION OF DELAWARE.

PROCESS OF RECOVERING OIL FROM SHALE.

Application filed November 26, 1920. Serial No. 426,558.

*To all whom it may concern:*

Be it known that I, CARL S. FOGH, a subject of the King of Denmark, residing at Philadelphia, in the county of Philadelphia and State of Pennsylvania, have invented certain new and useful Improvements in Processes of Recovering Oil from Shale, of which the following is a specification.

My invention relates to the volatilization of constituents of oil shales and oil sands, which constituents may be volatilized by heat alone. It has for its object the commercial treatment of large tonnages of these raw materials in a continuous operation, securing economies difficult to secure in retorts or any batch process.

My method further provides for a uniform heat treatment of the raw material practically in the absence of oxygen. In retorts of muffle-fired furnaces the material immediately adjacent to the side walls of the retort or lying on the muffle-fired hearth, is necessarily subjected to higher heats than the material lying near the center or on the surface, thus not securing a uniform heat treatment, which is desirable for the successful recovery of volatile values from these raw materials.

In my invention the raw material is rabbled over the hearths of the furnace and is repeatedly exposed to contact with hot gases and thus heated to the desired temperature to volatilize the volatile constituents of the raw material being furnaced. Further, by this process, I secure better and more uniform control of temperatures than can be secured in retorts, muffle-fired furnaces or the like, with a consequent reduction in the quantity of fixed gases formed.

My process comprises continuously feeding the oil shales or oil sands into and through a practically gas-tight mechanically-rabbled roasting furnace, preferably of the multiple-hearth type, such as the well-known Wedge furnace, or such modification thereof as is shown in my Patent No. 1,362,408, patented Dec. 14, 1920. As the material passes over the hearths of the furnace it is subjected to hot gases containing practically no free oxygen, and thus heated to such a temperature that the volatile constituents will be volatilized. The gases (carrying the volatile constituents) evolved in the furnace are or may be passed through a suitable dust separator or separators, and the clean gas is then passed through suitable condensers, in which the volatile constituents are collected for refining. The fixed gases pass on into a suitable gas container or holder. The residual or fixed gases are drawn from the gas holder or holders and are heated to the requisite temperature, as by passing through one or more heat interchangers, within which they are heated to the requisite temperature, and the heated fixed gases are introduced into the furnace. Suitable flues and fans are provided for maintaining continuous circulation of the gases throughout the system.

Fig. 2 is a diagrammatic showing of another form.

Figure 1:
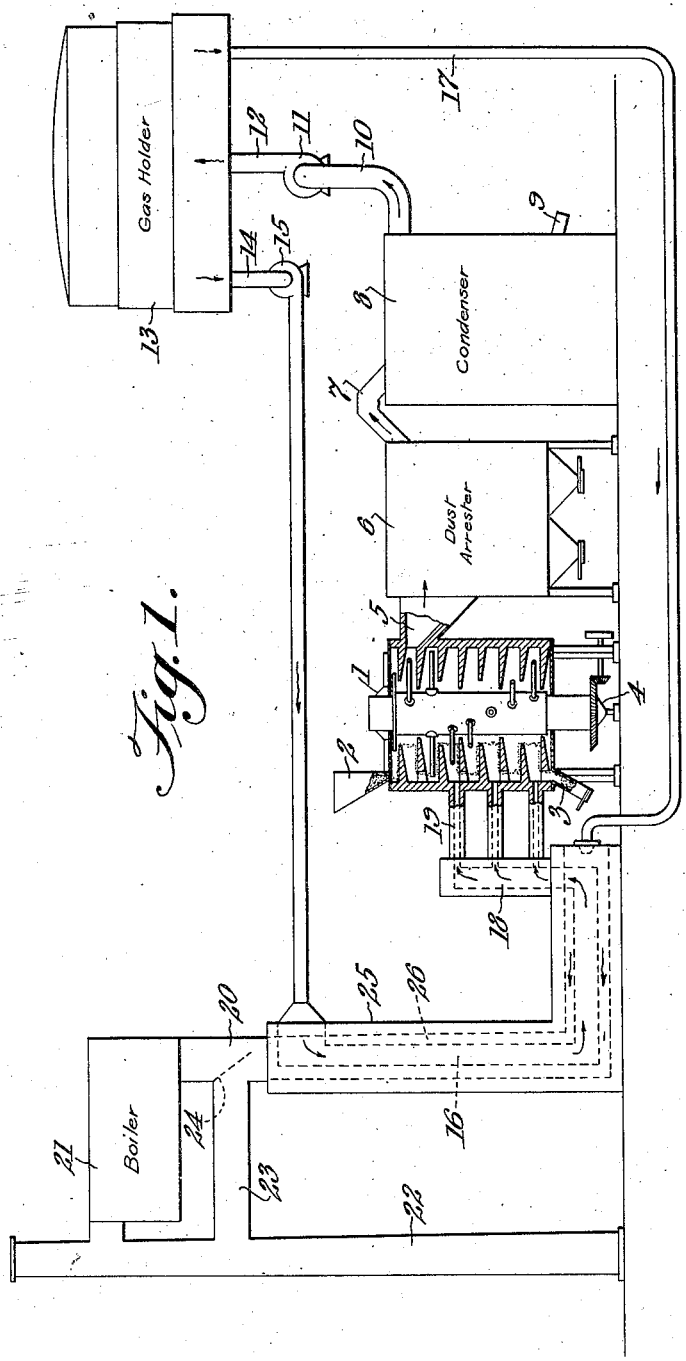
Fig. 1 is a diagrammatic showing of one form of plant.

A diagrammatic representation of the plant for carrying out the process is shown in Fig. 1, in which 1 is a multiple hearth roasting furnace provided with feeding apparatus 2 for introducing the oil shales or oil sands, a delivery chute 3 and mechanism 4, for operating the stirrer arms arranged to rotate on the hearths of the furnace. The gases pass from the furnace through flue 5 to a dust arrester 6, from which the gases pass by flue 7 to the condenser 8, wherein the volatile constituents are condensed and removed through discharge spout 9. The dust arrester may be omitted, if found to be unnecessary, and the gases and vapors passed directly to the condenser.

From the condenser the residual gases pass through flue 10, fan 11 and flue 12, to a gas holder 13. From the gas holders 13, the gas passes through flue 14 and fan 15 to fixed-gas ducts of heat interchanger 25. A part of the fixed gas may be passed through flue 17 to the combustion gas ducts 26 of the heat interchanger 25 encircling the fixed-gas ducts 16, where these gases are burned. If the available quantity of combustible fixed gases over and above the volume required for circulation through the furnace, is insufficient for preheating the circulating gas, the deficiency is made up by any suitable extraneous fuel. From the fixed gas ducts 16, the heated fixed gases pass into flue 18 and thence by one or more pipes 19, through one or more openings into the furnace 1. The combustion gases issuing from the combustion gas ducts of the heat interchanger may be passed by flue 20 through waste heat boilers 21 to stack 22. A flue 23, provided with suitable dampers 24, allows the waste gases to pass to stack 22 without passing through waste heat boilers.

In starting the operation of such a plant, the furnace is heated and started practically in the same manner as is done in smelter practice.

Some of the incoming crude material is burned thereby forming products of combustion which are circulated through the system until the free oxygen has been practically eliminated. The temperature of the circulating fixed gases is then raised to a point which will vaporize the volatile constituents from the oil shales or other material being fed to the furnace. These vapors are then carried by the circulating gases through the dust arrester, condenser, etc., in which the volatile constituents are precipitated and the fixed gases conveyed to the gas holder, the object being to have in reserve an excess quantity of fixed gases in the gas holder or holders, from which supply the fixed gas is conveyed through the heat interchanger back to the furnace in continuous operation.

By this process the oil shales or oil sands are continuously fed to the furnace and continuously discharged therefrom, handling large tonnages per furnace. The volatile constituents are continuously being vaporized by the continuous circulation of heated gases through the furnace, and carried from the furnace to the condensers, etc. By means of the heat interchanger I secure the advantage of the proper heat transfer surface area independent of the size of furnace used. In muffle-fired furnaces or retorts the transfer heat surface is limited by the size of the muffle-fired furnace or retort, which is objectionable from the standpoint of heat transference.

Further, by this process a uniform gradient of temperature may be maintained throughout the furnace, thus making it possible to secure the best operating conditions for the highest recovery of volatile constituents. As some of the volatile constituents, such as those producing ammonium sulphate, require higher temperatures and the use of steam, I propose to treat the shale in two steps if the recovery of ammonium sulphate is desired. That is, I use a duplication of the apparatus and process for this purpose. The discharged shale after passing through the first furnace, is charged to the second furnace in which fixed gases heated to a comparatively high temperature, and steam, are introduced. By thus having absolute control of the desired temperatures for these two necessarily different temperature operations, I avoid or reduce the cracking of the volatile compounds secured in low temperature distillation, thus increasing the recovery of oil constituents.

In the second or high-temperature treatment, as I require a higher mean temperature in the circulating gases, I will consequently have a higher temperature in the combustion gases passing through the heat interchanger. I propose therefor to use the waste heat in the combustion gases escaping from the heat interchanger for the production of steam required in the second stage roast.

The arrangement of the apparatus for carrying out this method is shown in Fig. 2 in which the right hand portion of the apparatus is the same as that shown in Fig. 1, and the left hand portion shows a similar arrangement. The construction and arrangement of this form of the apparatus will be readily understood from the drawing without further description, the only additional feature being a conveyor 30 which takes the product from roaster No. 1 at the point marked 31 and delivers it to roaster No. 2 at the point marked 32, the product from roaster No. 2 being delivered to the conveyor at the point 33 from which it is discharged at the point 34.

The process as described herein lends itself easily to the recovery of values from a gas-stream by absorption or other methods, such for example as the recovery of ethylene, propylene or the like by absorption in sulfuric acid; and it is within my invention to subject the exit gases, prior to their reentry into the furnace to any such recovery operation.

I claim:

1. The continuous process of vaporizing the volatile constituents of oil shales and oil sands comprising heating such material during its passage through a practically gas-tight mechanically-rabbled furnace by contact with practically non-oxidizing gases heated to a temperature sufficient to vaporize the volatile constituents, removing the gases carrying the volatile constituents from the furnace in continuous flow and condensing the condensible volatile constituents from the said gases, and reheating the fixed gases to a sufficient temperature to cause vaporization of the volatile constituents from the material passing through the furnace and passing such heated gases into the furnace.

2. In a continuous process of vaporizing the volatile constituents of oil shales and oil sands as claimed in claim 1, the steps comprising subjecting the material to distillation at successively lower and higher temperatures in separate operating stages.

In testimony whereof, I affix my signature.

CARL S. FOGH.